United States Patent [19]

Szostak

[11] Patent Number: 4,637,923

[45] Date of Patent: Jan. 20, 1987

[54] SYNTHETIC CRYSTALLINE SILICATE

[75] Inventor: Rosemarie Szostak, Cumming, Ga.

[73] Assignee: Mobil Oil Corporation, New York, N.Y.

[21] Appl. No.: 749,239

[22] Filed: Jun. 27, 1985

[51] Int. Cl.$^4$ .............................................. C01B 33/28
[52] U.S. Cl. .................................. 423/328; 423/329; 423/330; 502/60; 502/62; 502/77
[58] Field of Search ................................ 423/326–330; 502/62, 77, 60

[56] References Cited

U.S. PATENT DOCUMENTS

| | | | |
|---|---|---|---|
| 4,481,177 | 11/1984 | Valyocsik | 423/328 X |
| 4,483,835 | 11/1984 | Zones | 423/328 X |
| 4,585,639 | 4/1986 | Szostak | 423/328 |

FOREIGN PATENT DOCUMENTS

| | | | |
|---|---|---|---|
| 0042226 | 12/1981 | European Pat. Off. | 423/328 |
| 2077709 | 12/1981 | United Kingdom | 423/328 |

*Primary Examiner*—John Doll
*Assistant Examiner*—Jackson Leeds
*Attorney, Agent, or Firm*—Alexander J. McKillop; Michael G. Gilman; Dennis P. Santini

[57] ABSTRACT

This invention relates to a new synthetic porous crystalline material, a method for its preparation and use thereof in catalytic conversion of organic compounds. The new crystalline material exhibits a distinctive X-ray diffraction pattern.

11 Claims, No Drawings

SYNTHETIC CRYSTALLINE SILICATE

BACKGROUND OF THE INVENTION

1. Field of the Invention

This invention relates to a novel synthetic porous crystalline material, to a method for its preparation and to its use in catalytic conversion of organic compounds.

2. Description of the Prior Art

Zeolitic materials, both natural and synthetic, have been demonstrated in the past to have catalytic properties for various types of hydrocarbon conversion. Certain zeolitic materials are ordered, porous crystalline aluminosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example an alkali metal or an alkaline earth metal cation. This can be expressed wherein the ratio of aluminum to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation The spaces between the tetrahedra are occupied by molecules of water prior to dehydration.

Prior art techniques have resulted in the formation of a great variety of synthetic zeolites. The zeolites have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), zeolite ZSM-11 (U.S. Pat. No. 3,709,979), zeolite ZSM-12 (U.S. Pat. No. 3,832,449), zeolite ZSM-20 (U.S. Pat. No. 3,972,983), ZSM-35 (U.S. Pat. No. 4,016,245), ZSM-38 (U.S. Pat. No. 4,046,859), and zeolite ZSM-23 (U.S. Pat. No. 4,076,842), merely to name a few.

The $SiO_2/Al_2O_3$ ratio of a given zeolite is often variable. For example, zeolite X can be synthesized with $SiO_2/Al_2O_3$ ratios of from 2 to 3; zeolite Y, from 3 to about 6. In some zeolites, the upper limit of the $SiO_2/Al_2O_3$ ratio is unbounded. ZSM-5 is one such example wherein the $SiO_2/Al_2O_3$ ratio is at least 5 and up to infinity. U.S. Pat. No. 3,941,871 (Re. No. 29,948) discloses a porous crystalline silicate made from a reaction mixture containing no deliberately added alumina in the recipe and exhibiting the X-ray diffraction pattern characteristic of ZSM-5 type zeolites U.S. Pat. Nos. 4,061,724, 4,073,865 and 4,104,294 describe crystalline silicates or organosilicates of varying alumina and metal content.

SUMMARY OF THE INVENTION

The present invention is directed to a novel porous crystalline material, a method for its preparation, and the conversion of organic compounds contacted with a catalyst comprising an active form thereof.

The porous crystalline material, hereafter "zeolite", can be identified, in terms of moles of anhydrous oxides per 100 moles of silica, as follows:

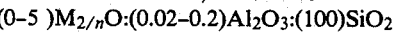

wherein M is at least one cation having a valence n, and wherein the zeolite is characterized by a distinctive X-ray diffraction pattern substantially as shown in Table 1 hereinafter.

In the synthesized form, the zeolite has a formula, on an anhydrous basis and in terms of moles of oxides per 100 moles of silica, as follows:

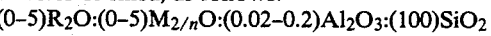

wherein M is an alkali or alkaline earth metal, n is the valence of M, and R is an organic cation of a Group VA element of the Periodic Table of the Elements (Sargent-Welch Scientific Company), particularly that derived from the diethylated linear diquaternary ammonium compound having the formula:

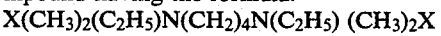

wherein X is an anion selected from the group consisting of fluoride, chloride, bromide, iodide, hydroxide and combinations thereof.

DESCRIPTION OF SPECIFIC EMBODIMENTS

The original alkali or alkaline earth metal cations of the as synthesized new zeolite can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations are those which render the new zeolite catalytically active, especially for hydrocarbon conversion. These include hydrogen, rare earth metals and metals of Groups IIA, IIIA, IVA, IB, IIB, IIIB, IVB, VIB and VIII of the Periodic Table of the Elements.

Typical ion exchange technique would be to contact the synthetic zeolite with a salt of the desired replacing cation or cations. Examples of such salts include the halides, e.g. chlorides, nitrates and sulfates.

The X-ray diffraction pattern of the as-synthesized new zeolite has the following characteristic lines:

TABLE 1

| Interplanar d-Spacing, A | Relative Intensity, I/Io |
|---|---|
| 10.90 ± 0.15 | VS |
| 6.91 ± 0.08 | W |
| 6.23 ± 0.08 | W |
| 5.18 ± 0.05 | W-M |
| 4.90 ± 0.05 | W |
| 4.35 ± 0.05 | M |
| 4.17 ± 0.03 | M |
| 3.86 ± 0.03 | W |
| 3.81 ± 0.03 | W |
| 3.78 ± 0.03 | W |
| 3.67 ± 0.03 | W |
| 3.57 ± 0.03 | M |
| 3.48 ± 0.03 | VS |

These values were determined by standard techniques. The radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the spectrometer. From these, the relative intensities, 100 I/$I_o$, where $I_o$ is the intensity of the strongest line or peak, and d (obs.) the interplanar spacing in Angstrom Units (A), corresponding to the recorded lines, were determined. In Table 1, the relative intensities are given in terms of the symbols W=weak, M=medium, S=strong and VS=very strong. In terms of intensities, these may be generally designated as follows:

W=0-20
M=20-40
S=40-60
VS=60-100

It should be understood that this X-ray diffraction pattern is characteristic of all the species of the new zeolite compositions. The sodium form as well as other cationic forms reveal substantially the same pattern with some minor shifts in interplanar spacing and variation in relative intensity. Other minor variations can occur, depending on the silicon to aluminum ratio of the particular sample, as well as its degree of thermal treatment. A search of known X-ray diffraction patterns revealed that the present zeolite is new with a distinctive structure.

The zeolite of the present invention can be used either in the alkali or alkaline earth metal form, e.g. the sodium or potassium form; the ammonium form; the hydrogen form or another univalent or multivalent cationic form The zeolite can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition to the extent aluminum is in the structure, impregnated therein or intimately physically admixed therewith. Such component can be impregnated in or on to it such as for example, by, in the case of platinum, treating the zeolite with a solution containing a platinum metal-containing ion. Thus, suitable platinum compounds include chloroplatinic acid, platinous chloride and various compounds containing the platinum amine complex.

The above zeolite, especially in its metal, hydrogen and ammonium forms can be beneficially converted to another form by thermal treatment. This thermal treatment is generally performed by heating one of these forms at a temperature of at least 370° C. for at least 1 minute and generally not longer than 20 hours. While subatmospheric pressure can be employed for the thermal treatment, atmospheric pressure is desired for reasons of convenience. The thermal treatment may be performed at a temperature up to about 925° C. The thermally treated product is particularly useful in the catalysis of certain hydrocarbon conversion reactions.

The new zeolite, when employed either as an adsorbent or as a catalyst in an organic compound conversion process should be dehydrated, at least partially. This can be done by heating to a temperature in the range of 200° C. to 595° C. in an inert atmosphere, such as air, nitrogen, etc. and at atmospheric, subatmospheric or superatmospheric pressures for between 30 minutes and 48 hours Dehydration can also be performed at room temperature merely by placing the zeolite in a vacuum, but a longer time is required to obtain a sufficient amount of dehydration.

The new zeolite can be prepared from a reaction mixture containing sources of an alkali or alkaline earth metal oxide, an oxide of aluminum, an oxide of silicon, an organic cation and water and having a composition, in terms of mole ratios of oxides, within the following ranges:

| Reactants | Useful | Preferred |
|---|---|---|
| $SiO_2/Al_2O_3$ | 500–5000 | 1000–3000 |
| $H_2O/SiO_2$ | 10–200 | 20–100 |
| $OH^-/SiO_2$ | 0.01–2.0 | 0.1–1.0 |
| $R/SiO_2$ | 0.02–1.0 | 0.05–0.5 |
| $M/SiO_2$ | 0.01–3.0 | 0.1–2.0 | wherein R and M are as above defined.

Crystallization of the new zeolite can be carried out at either static or stirred condition in a suitable reactor vessel, such as for example, polypropylene jars or teflon lined or stainless steel autoclaves. The total useful range of temperatures for crystallization is from about 100° C. to about 200° C. for a sufficient time to allow crystallization. Thereafter, the crystals are separated from the liquid and recovered. The composition can be prepared utilizing materials which supply the appropriate oxides. Such compositions may include sodium silicate, silica hydrosol, silica gel, silicic acid, sodium hydroxide, a source of aluminum, and an appropriate organic compound. The preferred organic compounds are diethylated, linear diquaternary ammonium compounds, generally expressed by the following formula

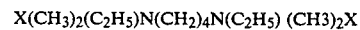

$$X(CH_3)_2(C_2H_5)N(CH_2)_4N(C_2H_5)(CH_3)_2X$$

wherein X is an above-defined anion. The organic cation derived from this compound may be represented as $(CH_3)_2(CH_2H_5)N^+(CH_2)_4N^+(C_2H_5)(CH_3)_2$.

The reaction mixture can be prepared either batchwise or continuously. Crystal size and crystallization time of the new crystalline material will vary with the nature of the reaction mixture employed and the crystallization conditions In all cases, synthesis of the new zeolite crystals is facilitated by the presence of at least 0.01 percent, preferably 0.10 percent and still more preferably 1 percent, seed crystals (based on total weight) of crystalline product.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In the case of many catalysts, it is desired to incorporate the new crystal with another material resistant to the temperatures and other conditions employed in organic conversion processes. Such materials include active and inactive material and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new zeolite crystal, i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

In addition to the foregoing materials, the new zeolite crystal can be composited with a porous matrix material such as silica- alumina, silica-magnesia, silica-zirconia, silica-thoria, silica- beryllia, silica-titania as well as ternary compositions such as silica-alumina-thoria, silica-alumina-zirconia silica-alumina-magnesia and silica-magnesia-zirconia.

The relative proportions of finely divided crystalline material and inorganic oxide gel matrix vary widely, with the crystal content ranging from about 1 to about 90 percent by weight and more usually, particularly when the composite is prepared in the form of beads, in the range of about 2 to about 80 weight percent of the composite.

Employing a catalytically active form of the novel crystal catalyst of this invention which may contain additional hydrogenation components, reforming stocks can be reformed employing a temperature between about 370° C. and about 540° C. The pressure can be between about 100 psig and about 1000 psig, but is preferably between about 200 psig and about 700 psig. The liquid hourly space velocity is generally between about 0.1 and about 10, preferably between about 0.5 and about 4, and the hydrogen to hydrocarbon mole ratio is generally between about 1 and about 20, preferably between about 4 and about 12.

The catalyst can also be used for hydroisomerization of normal paraffins, when provided with a hydrogenation component, e.g. platinum. Hydroisomerization is carried out at a temperature between about 90° C. and 375° C., preferably about 145° C. to about 290° C., with a liquid hourly space velocity between about 0.01 and about 2, preferably between about 0.25 and about 0.50, employing hydrogen such that the hydrogen to hydrocarbon mole ratio is between about 1:1 and about 5:1. Additionally, the catalyst can be used for olefin or aromatic isomerization, employing a temperature between about 200° C. and about 480° C.

The catalyst can also be used for reducing the pour point of gas oils This reaction may be conducted at a liquid hourly space velocity between about 10 and about 30 and at a temperature between about 425° C. and about 595° C.

Other reactions which can be accomplished employing the catalyst of this invention containing a metal, e.g. platinum, include hydrogenation-dehydrogenation reactions and desulfurization reactions, olefin polymerization (oligomerization) and other organic compound conversions such as the conversion of alcohols (e.g. methanol) to hydrocarbons, and the alkylation of aromatics (e.g. benzene).

In order to more fully illustrate the nature of the invention and the manner of practicing same, the following example is presented.

EXAMPLE

An aqueous solution containing 4.5 grams of concentrated sulfuric acid in 50 grams of water was added to a solution containing 50 grams of silica source material, i.e. Q-Brand sodium silicate (28.5 wt. % $SiO_2$, 8.8 wt. % $Na_2O$ and 62.7 wt. % $H_2O$) also containing about 200 ppm aluminum, or about 0.13 grams $Al_2O_3$/100 grams $SiO_2$, and 11.0 grams of organic having the formula $$I(CH_3)_2(C_2H_5)N(Ch_2)_4N(C_2H_5)(CH_3)_2I$$

in 85 grams of water. The mixture was heated in a stirred autoclave at 160° C. for 16 hours, cooled and filtered. The X-ray power diffraction pattern of the dried crystalline product, as synthesized, was measured and is listed in Table 2 in terms of 2 Theta and intensity values.

TABLE 2

| Observed 2 theta values | Relative Intensities |
|---|---|
| 8.1 | 87 |
| 12.8 | 15 |
| 14.2 | 18 |
| 17.1 | 20 |
| 18.1 | 13 |
| 20.4 | 32 |
| 21.3 | 21 |
| 23.0 | 12 |
| 23.3 | 12 |
| 23.5 | 11 |
| 24.2 | 12 |
| 24.9 | 27 |
| 25.6 | 100 |

What is claimed is:

1. A synthetic porous crystalline material having a composition, on an anhydrous basis and in terms of moles of oxides per 100 moles of silica, expressed by the formula $$(0-5)M_{2/n}O:(0.02-0.2)Al_2O_3:(100)SiO_2$$

wherein M is at least one cation having the valance n, said porous crystalline material being characterized by an X-ray diffraction pattern exhibiting values substantially as set forth in Table 1 of the specification.

2. The crystalline material of claim 1 having a composition, on an anhydrous basis and in terms of moles of oxides per 100 moles of silica, expressed by the formula:

$$(0-5)R_2O:(0-5)M_{2/n}O:(0.02-0.2)Al_2O_3:(100)SiO_2$$

wherein M is an alkali or alkaline earth metal, n is the valence of M, and R is an organic cation.

3. The crystalline material of claim 2 wherein M is selected from the group consisting of sodium and potassium.

4. The crystalline material of claim 3 wherein R is an organic cation derived from a diethylated, linear diquaternary compound having the formula $$X(CH_3)_2(C_2H_5)N(CH_2)_4N(C_2H_5)(CH_3)_2X$$

wherein X is an anion.

5. The crystalline material resulting from thermal treatment of the crystalline material of claim 1.

6. The crystalline material resulting from thermal treatment of the crystalline material of claim 2.

7. The crystalline material resulting from thermal treatment of the crystalline material of claim 3.

8. The crystalline material resulting from thermal treatment of the crystalline material of claim 4.

9. A porous crystalline material comprising the crystalline material of claim 1 having original cations replaced, at least in part, with a cation or a mixture of cations selected from the group consisting of hydrogen and hydrogen precursors, rare earth metals, and metals of Groups IIA, IIIA, IVA, IB, IIB, IIIB, IVB, VIB and VIII of the Periodic Table of the Elements.

10. A porous crystalline material comprising the crystalline material of claim 5 having original cations replaced, at least in part, with a cation or a mixture of cations selected from the group consisting of hydrogen and hydrogen precursors, rare earth metals, and metals of Groups IIA, IIIA, IVA, IB, IIB, IIIB, IVB, VIB and VIII of the Periodic Table of the Elements.

11. The crystalline material resulting from thermal treatment of the crystalline material of claim 9.

* * * * *